United States Patent [19]
Loegering

[11] Patent Number: 5,284,387
[45] Date of Patent: Feb. 8, 1994

[54] REMOVABLE FLEXIBLE TRACK BELT AND TRACK SECTION THEREFORE

[76] Inventor: George A. Loegering, 15970 35th St., Casselton, N. Dak. 58012

[21] Appl. No.: 937,498

[22] Filed: Aug. 28, 1992

[51] Int. Cl.⁵ .............................................. B62D 55/18
[52] U.S. Cl. .......................................... 305/56; 305/39
[58] Field of Search ..................... 305/13, 39, 45, 56, 305/58 R, 19

[56] References Cited

U.S. PATENT DOCUMENTS

| | | | |
|---|---|---|---|
| 1,942,338 | 1/1934 | Kennedy | 305/45 X |
| 2,532,824 | 12/1950 | Sinclair | 305/56 |
| 3,497,271 | 2/1970 | Keller | 305/13 |
| 4,089,565 | 5/1978 | Loegering et al. | 305/45 |
| 4,099,794 | 7/1978 | Hoffart | 305/13 |

*Primary Examiner*—Russell D. Stormer
*Attorney, Agent, or Firm*—Moore & Hansen

[57] ABSTRACT

The present invention provides a track section adapted to be linked to a plurality of similar track sections to form a flexible track belt for wrap around mounting on a vehicle tire, each track section having a rigid ground engaging base pad, a pair of spaced apart side wall structures that include a side plate and a pair of side plate support segments. The side plate has upper and lower portions with the lower portion disposed at an angle of between sixty-three and sixty-eight degrees relative to the horizontal. The upper portion is bent inwardly relative to the lower portion such that its inner tire engaging surface is at an angle of four to seven degrees relative to the inner surface of the lower portion. The support segments each have a pair of spaced apart apertures disposed a first distance from the ground when the track section is in a ground engaging position. The apertures of each support segment are spaced a second distance apart such that the first distance lies within the range of about forty to about seventy percent of the second distance.

17 Claims, 2 Drawing Sheets

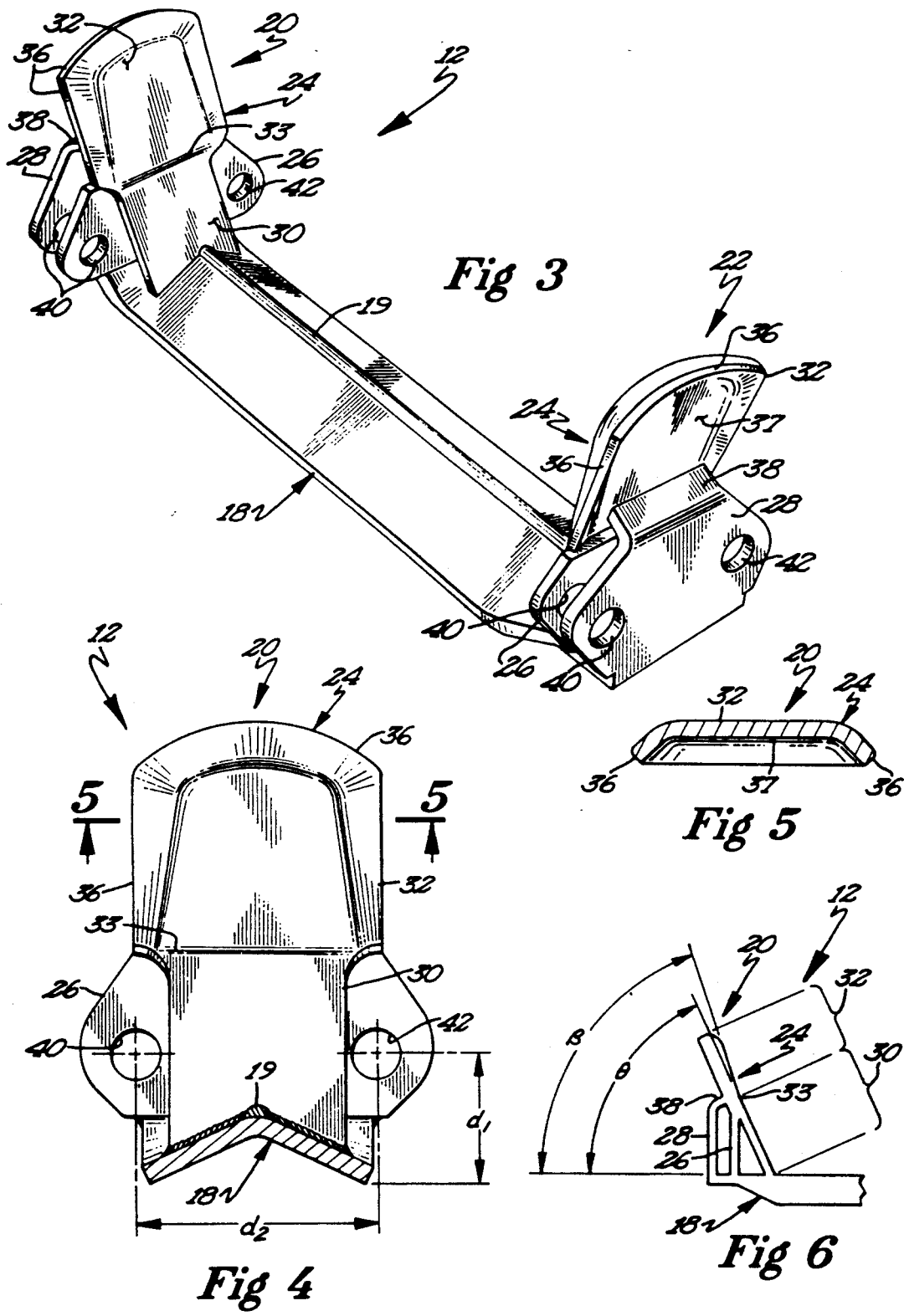

REMOVABLE FLEXIBLE TRACK BELT AND TRACK SECTION THEREFORE

The present invention generally relates to removable, flexible track belts used to wrap around vehicle tires to provide additional traction and particularly to an improved track section for such track belts that reduces tire wear and extends the life of the linking mechanisms that link together adjacent track sections of the flexible track belt.

BACKGROUND OF THE PRESENT INVENTION

The use of an endless track as a traction enhancer for wheeled vehicles is well known. Typically, such belts comprise a plurality of individual track sections that are linked together for pivotal movement with respect to adjacent track sections. These track belts have traditionally been used to obtain better overall traction for the vehicle generally and in wet and slippery conditions particularly. Examples of such prior art track belts are disclosed in U.S. Pat. No. 3,497,271 to Keller, U.S. Pat. No. 4,089,565 to Loegering, et al., and U.S. Pat. No. 4,099,794 to Hoffart. The Keller patent discloses and claims a double-pivot linkage between adjacent track sections, whereas the Hoffart and Loegering patents disclose single pivot linkages wherein adjacent track sections are linked to each other about a single pivot pin connection. Single pivot linkage mechanisms are often used where the tires of the vehicle are extremely rounded, where three or more wheels will have a flexible belt mounted to them, or where there is a long wheelbase between adjacent wheels. In those circumstances, the single pivot linkage mechanism, such as that shown in Loegering '565 and Hoffart '794 are usually more desirable because they rock and flex less than the known double pivot linkages; that is, they are more rigid than the double or dual pivot linkage and therefore prevent substantial side tilting of the track sections and, therefore, the vehicle tires are less likely to walk out of the track belt.

Generally, each of the track sections include a base pad structure having an elongated shape that engages the ground during operation of the vehicle. The base pad forms a cross bar that extends between a pair of opposed sidewalls, which in turn each extend upwardly from the base pad on opposite longitudinally spaced ends thereof. Adjacent track sections are linked together by a linkage mechanism. Usually, though not necessarily, the linkage mechanism includes the sidewalls having at least one clevis type structure that receives a link therebetween. In a double or dual pivot linkage such as that shown in the Keller '271 patent, the link extends between adjacent clevises of adjacent track sections. In the single pivot linkage, one end of the link is integral with the side wall of one of the track sections and extends into a pivotal engagement with the clevis of the adjacent track section. In both linkage mechanisms, the clevis and the link have aligned apertures that receive a fastener or pivot pin that forms therewith the pivotal link mechanism by which the adjacent track sections are connected. As noted, a double or dual pivot linkage mechanism includes a pair of clevis structures for each track section by which the track section is pivotally connected on both lateral sides to the adjacent track sections.

During operation of a vehicle utilizing such flexible belts, the vehicle tires are normally guided within the track sections by the side walls of the track section. The prior art track sections usually guide the tires by engaging the soft side wall of the tire. For example, both the Hoffart '794 and the Loegering '565 track sections each tend to guide the tire utilizing the tire side wall, resulting in side wall wear on the tire.

In addition, during normal operation, the vehicle will often experience forces directed sideways to the track belt, or along the longitudinal direction of extent of the individual track sections. When experiencing these side loading forces, the tires will tend to crawl upwardly along the sidewall of the track section. This side loading of the tires into the sidewall of the track section creates wear on the tire, in particular on the tire sidewall, which is usually thinner and softer than the tire tread and thus more susceptible to wear.

On uneven terrain, such as where rocks are encountered by one side of a track section, the track belt can experience significant rocking and flexing of the individual track sections relative to adjacent track sections or of an end of a single track section relative to the other end thereof. This rocking and flexing of the track sections also contributes to tire wear as well as significant wear on the linkage mechanism connecting adjacent track sections. In the single pivot linkage mechanism the pivot pin is forced to endure a significant weight transfer due to the rigidity of the linkage between adjacent track sections. That is, when an object is encountered by one side of the track section, the track section will tend to tilt. Since it is rigidly, and often integrally, attached at one end of the link, however, tilting of the track section is inhibited and the tilting load is transferred to the pin, which can cause significant, accelerated wear on the linkages of a single pivot linkage. The pin in effect acts as a saw, increasing the wear. Because the track sections of a double pivot linkage are pivotally attached at on both sides, the track section can pivot independently on one side of the pad with respect to the opposite side thereof, thereby lessening the load transfer to the pin, and thereby reducing the wear. As noted previously though, known double pivot linkages are relatively more flexible and therefore facilitate the tire wheels to walk out of the track belt.

It would be desirable to have an improved track belt formed of double pivot track sections that subjected both the tires and the linkage mechanism between adjacent track sections to reduced wear.

SUMMARY OF THE PRESENT INVENTION

It is an object of the present invention to provide a new and improved invention that is not subject to the foregoing disadvantages.

It is another object of the present invention to provide a new and improved track section useful in the formation of a wrap-around flexible belt for mounting on vehicle tires that causes less wear on the vehicle tires.

It is still another object of the present invention to provide a new and improved track section useful in the formation of a wrap-around flexible track belt that is subject to reduced wear on the linkage mechanism connecting adjacent track sections.

The foregoing objects of the present invention are accomplished and achieved by the present invention by providing a track section adapted for double pivot linkage to similar track sections to form a flexible belt for wrap-around mounting engagement on at least one vehicle tire wherein the track section has a rigid, ground engaging base pad and a pair of opposed, spaced apart side wall structures. Each side wall structure has a side plate having a substantially continuous, elongate, outwardly sloping configuration and includes upper and lower portions with the upper portion being bent inwardly relative to the lower portions. The lower portion of the side plate is substantially planar while the upper portion includes a somewhat convex tire engaging inner surface. Preferably, the lower portion is disposed at an angle of between about sixty-three degrees (63°) to about sixty-eight degrees (68°) relative to the base pad and the upper portion is disposed at an angle of about seventy degrees (70°) to about seventy-five degrees (75°), that is, the upper section is bent inwardly relative to the lower portion about four degrees (4°) to about seven degrees (7°).

The preferred embodiment of the track section of the present invention also has a pair of spaced apart side plate supports that project upwardly from opposite ends of the base pad, each of the side plate supports including inner and outer spaced apart, apertured support segments defining a slot or clevis therebetween. The dual pivot linkage mechanism for adjacent track sections includes the support segments, the apertures in the support segments, an apertured link arm that provides a first pivot along one side of the track section and a pivot or fastener pin inserted through the apertures in the support segments. A similar link arm and fastener pin attached to the other side of the same end of the track section provides the second pivot so as to form a dual pivot linkage mechanism on each end of the track section. In the preferred embodiment of the present invention, the support segment apertures are disposed a first distance above the ground when the track section is in a ground engaging position and are spaced a second distance apart from each other. Preferably, the first distance is within the range of about forty to seventy percent (40% to 70%) of the second distance, thereby substantially reducing the rocking and flexing otherwise found in known double pivot track sections.

The foregoing enumerated objects of the present invention, as well as others not explicitly set forth, will become apparent to those skilled in the art when the following detailed description of the present invention is read in conjunction with the accompanying drawings and claims. Throughout the drawings, like numerals refer to similar or identical parts.

BRIEF DESCRIPTION OF THE DRAWINGS

FIG. 3 is a perspective view of the track section shown in FIG. 2;

FIG. 4 is a side elevation, partial cross sectional view of the track section shown in FIG. 2 taken along cutting plane 4—4 of FIG. 2;

FIG. 5 is a cross sectional view of the side plate of the track section shown in FIG. 4 taken along cutting plane 5—5 of FIG. 4; and FIG. 6 is a schematic view of an end of a track section in accordance with the present invention and illustrates the angular dispositions of the lower and upper portions of the side plates.

DETAILED DESCRIPTION OF THE PRESENT INVENTION

Figure 1:
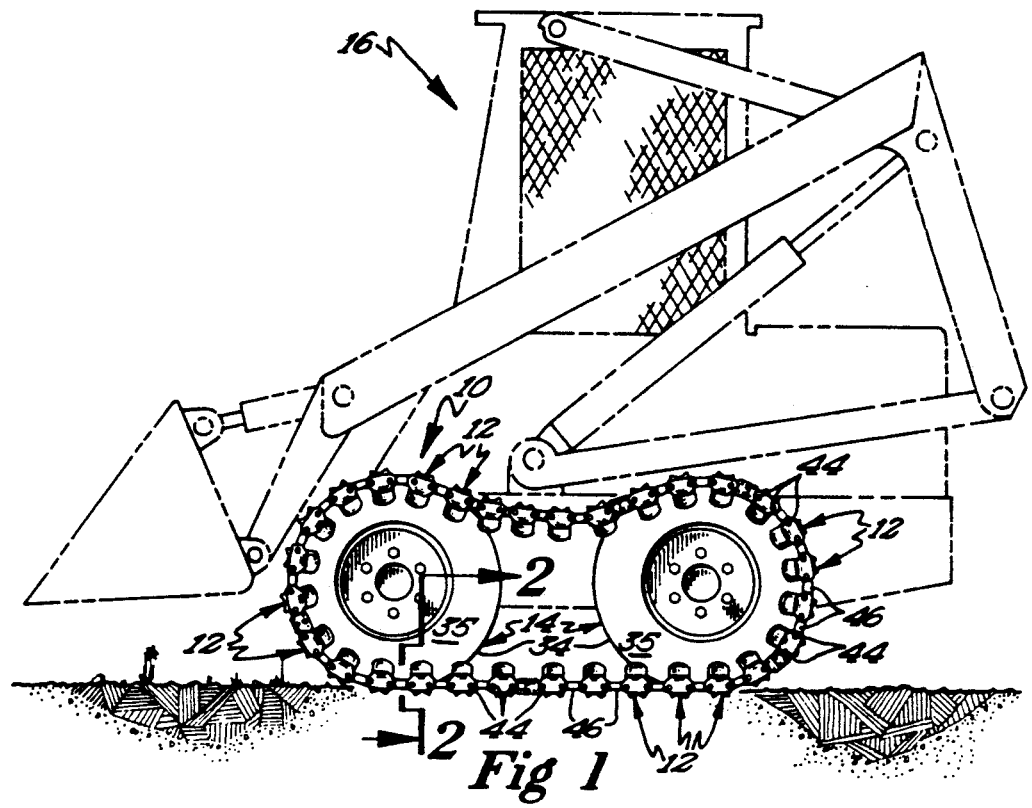
FIG. 1 shows a track belt embodying the present invention mounted on a skid-steer loader.

FIG. 1 shows a track belt 10 comprising individual track sections 12 mounted for wrap around engagement with the wheels 14 of a vehicle 16 of the well known skid-steer type of loader. Each track section 12 is double pivotally connected to adjacent track sections as will be explained below.

Referring now to FIGS. 2-6, a track section 12 in accordance with the present invention will be described and its advantages over prior art track sections will be set forth. Track section 12 is substantially symmetrical about its midpoint such that it may be reversed and used in a track belt on either side of vehicle 16. Each track section comprises a rigid, ground engaging base pad 18 having an elongated shape defining a longitudinal direction of extent. Base pad 18 includes a traction enhancer 19, which may simply be a weld bead, and serves as a cross bar connecting a pair of spaced apart side wall structures 20 and 22 that project upwardly from the opposite ends of base pad 10. Side wall structures 20 and 22 are substantially identical and so it will be understood that a description of one side wall structure will suffice as a description of the other.

Each side wall structure 20 and 22 includes a side plate 24 that is angularly supported by a side plate support structure, each of which in turn comprises spaced apart support segments 26 and 28. Each side plate 24 is substantially continuously outwardly inclined and comprises a lower portion 30 and an upper portion 32 angularly bent inwardly relative to lower portion 30 at bend 33 of side plate 24. As best seen in FIG. 6, lower portion 30 is disposed at an angle $\theta$ relative to an axis drawn parallel to the longitudinally extending base pad 18. Preferably, $\theta$ should fall within the range of about sixty-three degrees (63°) to about sixty-eight degrees (68°) relative to the base pad. Lower portion 30 is angled so as to firmly engage the hard tire tread 34 of tire 14, which is shown in phantom in FIG. 2. If lower portion 30 of side plate 24 were disposed at an angle $\theta$ less than sixty-three degrees (63°), that is, if lower portion 30 were flatter relative to base pad 18, the tire 14 would tend to "walk" up side plate 24 under substantially normal operating conditions. Similarly, if $\theta$ were greater than about sixty-eight degrees (68°), that is, if lower portion 30 were steeper, lower portion 30 would not guide the tire 14 by engagement with the tread section 36 and would instead contact the side wall 35 of the tire 14, resulting in side wall wear and damage. Preferably, lower portion 30 has a substantially planar configuration to avoid damaging the tread 34 of the tire 14.

The inner surface of upper portion 32 of side plate 24 is disposed at an angle $\beta$ relative to an axis drawn parallel to the longitudinally extending base pad 18. Preferably, $\beta$ should be within the range of about seventy degrees (70°) to about seventy-five degrees (75°); that is, upper portion 32 should be bent inwardly towards the center of base pad 18 about bend 33 such that the inner tire engaging surface of upper portion 32 is disposed at an angle of about four degrees (4°) to about seven degrees (7°) relative to the inner tire engaging surface of lower portion 30. This inward inclination of upper portion 32 will substantially prevent the tire 14 from climbing up over the side plate 24 of track section 12 in side loading conditions. Preferably, and as best seen in FIGS. 3-5, side plate upper portion 32 has a somewhat convex tire engaging surface. In other words, upper portion 32 is bubbled inwardly such that the inwardly facing surface of upper portion 32 assumes a curved-away configuration so as to present a rounded, more gentle support to the tire side wall. Stated otherwise, outer edge 36 of upper portion 32 is curved outwardly so as to avoid the presentation of sharp edges to the tire side wall 35. This configuration helps reduce tire wear and avoid tire damage, particularly to the tire side wall 35, during side loading situations when tire 14 tends to crawl out of flexible belt 10 by not presenting sharp edges to tire 14 under such circumstance.

Figure 2:
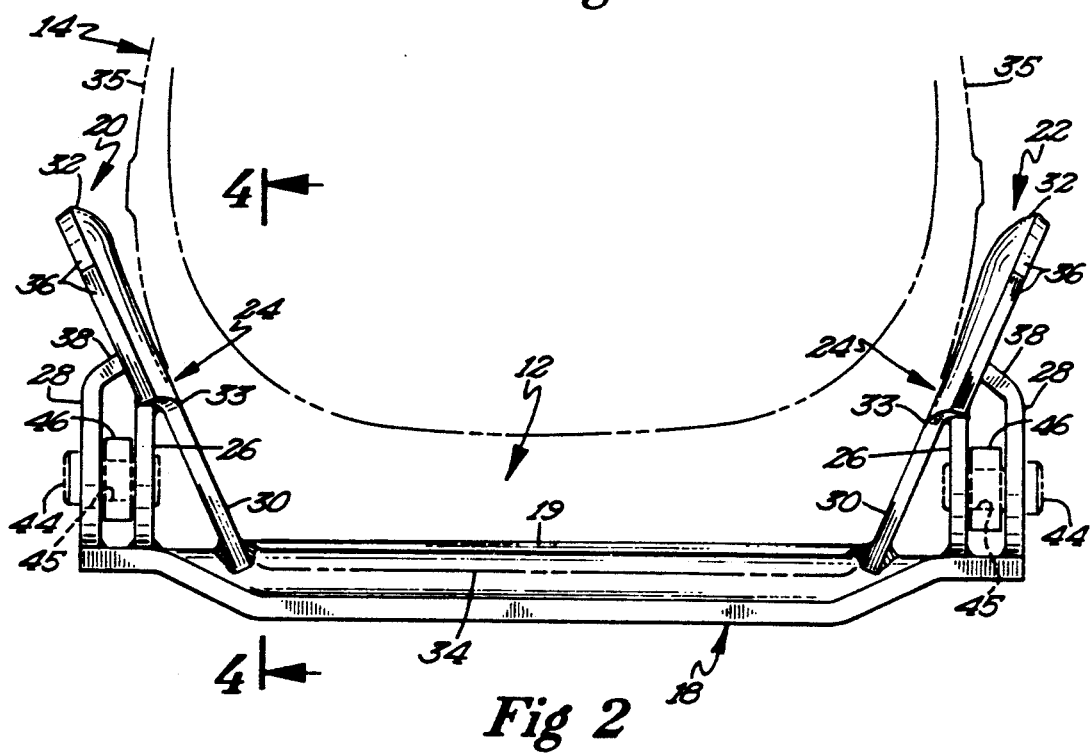
FIG. 2 is a front elevation view of a track section in accordance with the present invention.

Referring particularly to FIGS. 2-4, support segments 26 and 28 are rigidly attached to base pad 18 at one end thereof and at the other end thereof are rigidly attached to outer surface 37 of side plate 24. Support segment 28 is slightly longer than support segment 26, which has a substantially planar configuration as seen in FIG. 3, and has an upper portion 38 bent inwardly to engage outer surface 37 of side plate 24. Support segments 26 and 28 support side plate 24 in its angular disposition as previously noted. Both support segments 26 and 28 have a pair of laterally spaced apart apertures 40 and 42. Apertures 40 of support segments 26 and 28 are aligned so as to receive a pivot pin 44 as are apertures 42 of support segments 26 and 28. Pivot pin 44 extends through an aperture 45 (shown in phantom) in a link 46 (shown in phantom) that extends between adjacent track sections. Thus, support segments 26 and 28 along with the aligned apertures 40 and 42 form a pair of clevis type structures that along with a pair of pivot pins 44 and links 46 form a pivotal linkage between adjacent track sections. These linkage mechanisms on each side of track section 12 thus form the double linkage mechanism previously described.

Apertures 40 and 42 are each spaced a first distance $d_1$ from the ground when the track section 12 is in a ground engaging position as shown in FIGS. 1, 2, and 4. Additionally, apertures 40 and 42 are spaced a second distance $d_2$ apart from each other. Preferably, first distance $d_1$ is less than second distance $d_2$. This reduces the tendency of double pivot track section 12 to flex and rock during operation. In a preferred embodiment first distance $d_1$ is preferably less than about seventy percent of second distance $d_2$, that is $$d_1 \leq 0.7 d_2.$$

Additionally, first distance $d_1$ is preferably greater than about forty percent of second distance $d_2$, that is $$0.4 d_2 \leq d_1.$$

Thus, first distance $d_1$, that is, the distance from the aperture centers to the ground preferably lies within a size range of about forty percent to about seventy percent of the second distance $d_2$, the distance between apertures 40 and 42, or $$0.4 d_2 \leq d_1 \leq 0.7 d_2.$$

This distance ratio advantageously allows the use of double pivot linkages in new use situations in that it reduces the rocking and flexing found in prior art double pivot linkages, such as that of the Keller '271 patent where the ratio of the distance of the aperture to the ground to the distance between apertures is greater than one to one in one embodiment (FIG. 2) and two to one in another (FIG. 5). This new track section structure thereby further reduces the wear experienced by double pivot linkages over that seen in single pivot linkages.

In the embodiment of the present invention shown in the drawings and disclosed herein, base pad 18, side plate 24, and support segments 26 and 28 are each fabricated as individual pieces that are then rigidly attached to each other by known means such as welding. Other means known to the art for rigidly engaging the aforementioned pieces may equally be used so long as those joining methods produce a track section able to withstand the stresses and forces that accompany use thereof.

It will be understood that a track belt 10 such as that shown in FIG. 1 will include adjustable links for taking up slack in the track belt as it is used in normal operations. Such adjustment mechanisms are well known in the art and will not be described in detail herein. Generally, such mechanisms include links having a plurality of laterally extending apertures so that the distance between adjacent track sections may be varied and reduced as the track belt normally lengthens during use thereof.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

I claim:

1. A track section adapted to be linked to a plurality of similar track sections to form a flexible track belt for wraparound mounting on a vehicle tire, each said track section comprising:

a rigid, ground engaging base pad of elongated shape, said elongated shape defining a longitudinal direction of extent;

a pair of spaced apart sidewall structures projecting upwardly from the opposite longitudinal ends of said base pad in its ground engaging position, whereby said base pad serves as a crossbar connecting said sidewall structures, each of said sidewall structures including:

inner and outer longitudinally spaced apart support segments defining a slot therebetween, each support segment having top and bottom ends with said bottom end engaging said base pad;

a side plate, said side plate having an outwardly inclined, elongate configuration comprising upper and lower portions, said upper portion being bent inwardly, said side plate having a bottom end engaging said base pad, an outer surface and an inwardly curved tire engaging inner surface, said outer surface engaging said inner and outer support segments, whereby each said side plate is angularly supported by said base pad and said inner and outer support segments; and means for connecting adjacent base pads to form said flexible track belt.

2. The track section of claim 1 wherein said means for connecting comprises:

each said support segment including a pair of laterally spaced apart apertures such that the laterally forward apertures of said inner and outer support segments are substantially aligned and such that the laterally rearward apertures of said inner and outer support segments are substantially aligned;

a link extending between inner and outer support segments of adjacent track sections, said link having apertured opposing ends with said ends being received within said slot between said inner and outer support segments; and a fastener extending though said inner support segment aperture, through said link aperture and through said outer support segment aperture, whereby said link may be pivotally fastened at opposing ends to adjacent track sections.

3. The track section of claim 2 wherein said support segment apertures each have a center and wherein said center of each said support segment aperture is disposed a distance $d_1$ form the ground when said pad is in a ground engaging position and the centers of the laterally spaced apart apertures of each support segment are a distance $d_2$ apart, such that $$d_2 > d_1.$$

4. The track section of claim 3 wherein $d_1$ is about $0.7 d_2$.

5. The track section of claim 3 wherein $$0.4 d_2 \leq d_1 \leq 0.7 d_2.$$

6. The track section of claim 1 wherein said lower portion of each said side plate is disposed within a range of about sixty-three degrees (63°) to about sixty-eight degrees (68°) relative to said longitudinal direction of extent.

7. The track section of claim 6 wherein said upper portion of each said side plate is disposed within a range of about seventy degrees (70°) to about seventy-five (75°) relative to said longitudinal direction of extent.

8. The track section of claim 1 wherein said upper portion of each said side plate is disposed within a range of about seventy degrees (70°) to about seventy-five (75°) relative to said longitudinal direction of extent.

9. A double pivot track section adapted to be linked to a plurality of similar track sections to form a flexible track belt for wraparound mounting on a vehicle tire, each said track section comprising:

a rigid, ground engaging base pad of elongated shape, said elongated shape defining a longitudinal direction of extent;

a pair of spaced apart sidewalls projecting upwardly from the opposite longitudinal ends of said base pad in its ground engaging position, whereby said base pad serves as a crossbar connecting said sidewalls, each of said sidewalls including:

inner and outer longitudinally spaced apart support segments defining a slot therebetween, each support segment having top and bottom ends with said bottom end engaging said base pad;

a side plate, said each side plate having an elongate configuration comprising upper and lower portions, each said side plate having a bottom end engaging said base pad, an outer surface and a tire engaging inner surface, said outer surface engaging said inner and outer support segments, whereby each said side plate is angularly supported by said base pad and said inner and outer support segments; and means for connecting adjacent base pads to form said flexible track belt.

10. The track section of claim 9 wherein said means for connecting comprises:

each said support segment including a pair of laterally spaced apart apertures such that the laterally forward apertures of said inner and outer support segments are substantially aligned and such that the laterally rearward apertures of said inner and outer support segments are substantially aligned;

a link extending between inner and outer support segments of adjacent track sections, said link having apertured opposing ends with said ends being received within said slot between said inner and outer support segments; and a fastener extending though said inner support segment aperture, through said link aperture and through said outer support segment aperture, whereby said link may be pivotally fastened at opposing ends to adjacent track sections.

11. The track section of claim 10 wherein said support apertures each have a center and wherein said center of each said support segment aperture is disposed a distance $d_1$ form the ground when said pad is in a ground engaging position and the centers of the laterally spaced apart apertures of each support segment are a distance $d_2$ apart, such that $$d_2 > d_1.$$

12. The track section of claim 11 wherein $d_1$ is about $0.7 d_2$.

13. The track section of claim 11 wherein $$0.4 d_2 \leq d_1 \times 0.7 d_2.$$

14. The track section of claim 9 wherein said lower portion of each said side plate is disposed within a range of about sixty-three degrees (63°) to about sixty-eight degrees (68°) relative to said longitudinal direction of extent.

15. The track section of claim 14 wherein said upper portion of each said side plate is disposed within a range of about seventy degrees (70°) to about seventy-five (75°) relative to said longitudinal direction of extent.

16. The track section of claim 9 wherein said upper portion of each said side plate is disposed within a range of about seventy degrees (70°) to about seventy-five (75°) relative to said longitudinal direction of extent.

17. The track section of claim 9 wherein said upper portion is bent inwardly relative to said lower portion within a range of about four degrees (4°) to about seven degrees (7°).

* * * * *

UNITED STATES PATENT AND TRADEMARK OFFICE
CERTIFICATE OF CORRECTION

PATENT NO. : 5,284,387
DATED : 2/8/94
INVENTOR(S) : George A. Loegering

It is certified that error appears in the above-indentified patent and that said Letters Patent is hereby corrected as shown below:

In claim 2, col. 7, line 8, delete "though" and substitute --through-- therefor.

In claim 11, col. 8, line 30, delete "form" and substitute --from-- therefor.

In claim 13, col. 8, line 41, delete "x" and substitute -- ≤ -- therefor.

Signed and Sealed this

Ninth Day of August, 1994

Attest:

BRUCE LEHMAN

Attesting Officer

Commissioner of Patents and Trademarks